United States Patent
Sivaprakasam et al.

(10) Patent No.: US 9,424,059 B1
(45) Date of Patent: Aug. 23, 2016

(54) SYSTEM AND METHODS FOR IMPLEMENTING QUALITY OF SERVICE IN A NETWORKED VIRTUALIZATION ENVIRONMENT FOR STORAGE MANAGEMENT

(71) Applicant: Nutanix, Inc., San Jose, CA (US)

(72) Inventors: Suresh Sivaprakasam, Saratoga, CA (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 14/206,774

(22) Filed: Mar. 12, 2014

(51) Int. Cl.
  *G06F 9/44*  (2006.01)
  *G06F 9/455* (2006.01)
  *H04L 12/24* (2006.01)
  *H04L 29/06* (2006.01)

(52) U.S. Cl.
  CPC ........ *G06F 9/45533* (2013.01); *H04L 41/0893* (2013.01); *H04L 65/80* (2013.01)

(58) Field of Classification Search
  CPC .................................................. G06F 9/45533
  See application file for complete search history.

(56) References Cited

U.S. PATENT DOCUMENTS

| | | | | |
|---|---|---|---|---|
| 8,601,473 | B1 * | 12/2013 | Aron et al. | 718/1 |
| 2002/0184529 | A1 * | 12/2002 | Foster | H04L 49/357 726/4 |
| 2007/0156955 | A1 * | 7/2007 | Royer et al. | 711/113 |
| 2011/0022812 | A1 * | 1/2011 | van der Linden et al. | 711/163 |
| 2011/0154318 | A1 * | 6/2011 | Oshins et al. | 718/1 |
| 2012/0096461 | A1 * | 4/2012 | Goswami et al. | 718/1 |
| 2012/0117566 | A1 * | 5/2012 | Maeda | G06F 21/53 718/1 |
| 2014/0297284 | A1 * | 10/2014 | Gruber | G10L 15/18 704/257 |
| 2014/0321469 | A1 * | 10/2014 | Goel | G06F 9/505 370/392 |
| 2014/0336785 | A1 * | 11/2014 | Asenjo | G05B 19/4185 700/17 |

OTHER PUBLICATIONS

K. Nichols, et al., "Definition of the Differentiated Services Field (DS Field) in the IPv4 and IPv6 Headers", RFC 2474, Standards Track, Dec. 1998, 20 pages.
S. Blake, et al., "An Architecture for Differentiated Services", RFC 2475, Informational, Dec. 1998, 36 pages.

* cited by examiner

*Primary Examiner* — Chameli Das
(74) *Attorney, Agent, or Firm* — Vista IP Law Group, LLP; Peter C. Mei

(57) ABSTRACT

A method for implementing quality of service (QoS) for network communications sharing a network in a networked virtualization environment for storage management, includes receiving a network communication from a controller VM, identifying whether the network communication is a data communication type issued by a user VM or a control communication type issued by the controller VM, applying a set of rules to the network communication based on its communication type, and placing the network communication in a prioritization class queue based on a result of applying the set of rules to the network communication.

24 Claims, 20 Drawing Sheets

SYSTEM AND METHODS FOR IMPLEMENTING QUALITY OF SERVICE IN A NETWORKED VIRTUALIZATION ENVIRONMENT FOR STORAGE MANAGEMENT

CROSS REFERENCE TO RELATED APPLICATIONS

The present application is related to U.S. Pat. No. 8,601,473, issued on Dec. 3, 2013, entitled "ARCHITECTURE FOR MANAGING I/O AND STORAGE FOR A VIRTUALIZATION ENVIRONMENT", which is hereby incorporated by reference in its entirety.

FIELD

This disclosure concerns a networked virtualization environment for storage management, and in particular to system and methods for implementing quality of service (QoS) in a networked virtualization environment for storage management.

BACKGROUND

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

A given node may be servicing I/O requests for several different user virtual machines (VMs) at a given time. I/O requests from user VMs directed at networked storage or local storage of another node in the networked virtualization environment will require access to the network. Likewise, communication between nodes within the networked virtualization environment pertaining to control information such as metadata, upgrades, fault tolerance and availability will also require access to the network. I/O requests from user VMs directed at networked storage or local storage of another node in the networked virtualization environment may be referred to herein as data communications, while communications between nodes pertaining to the control information may be referred to herein as control communications. It is important to note that data communications may involve communicating I/O requests between different nodes in the networked virtualization environment.

In a conventional networked storage management environment, data communications (e.g., I/O requests to storage) and control communications (e.g., communications between nodes pertaining to control information) utilize different networks. However, in certain networked virtualization environments for storage management, I/O requests to storage and communications between nodes pertaining to control information utilize the same network. Such networked virtualization environments for storage management reduce the amount of physical resources required, as a lesser number of physical switches are needed to implement the networked virtualization environment for storage management.

Networked virtualization environments where data communications (e.g., I/O requests to storage) and control communications (e.g., communications between nodes pertaining to control information) utilize the same network may be referred to as a converged networked. Such a converged network allows for networks at different abstractions (e.g., communication networks and storage networks) to be overlaid, thereby providing a reduction in resource costs as well as operational costs, by requiring less hardware equipment, less consumption of power and fewer administrative costs. Converged networks also offer for a single domain that provides for both high availability and fault tolerance.

However, the need to efficiently differentiate between data communications (e.g., I/O requests to storage) and control communications (e.g., communications between nodes pertaining to control information) within the networked virtualization environment and the need to properly assign priorities to such network communications for network usage arises where data communications (e.g., I/O requests to storage) and control communications (e.g., communications between nodes pertaining to control information) utilize the same network.

SUMMARY

Embodiments of the present invention provide systems and methods for implementing quality of service in a networked virtualization environment for storage management. According to some embodiments, a method for implementing quality of service (QoS) for network communications sharing a network in a networked virtualization environment for storage management, including receiving a network communication from a controller VM, identifying whether the network communication is a data communication type issued by a user VM or a control communication type issued by the controller VM, applying a set of rules to the network communication based on its communication type, and placing the network communication in a prioritization class queue based on a result of applying the set of rules to the network communication.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

Embodiments of the present invention provide system and methods for implementing quality of service (QoS) in a networked virtualization environment for storage management.

Figure 1:
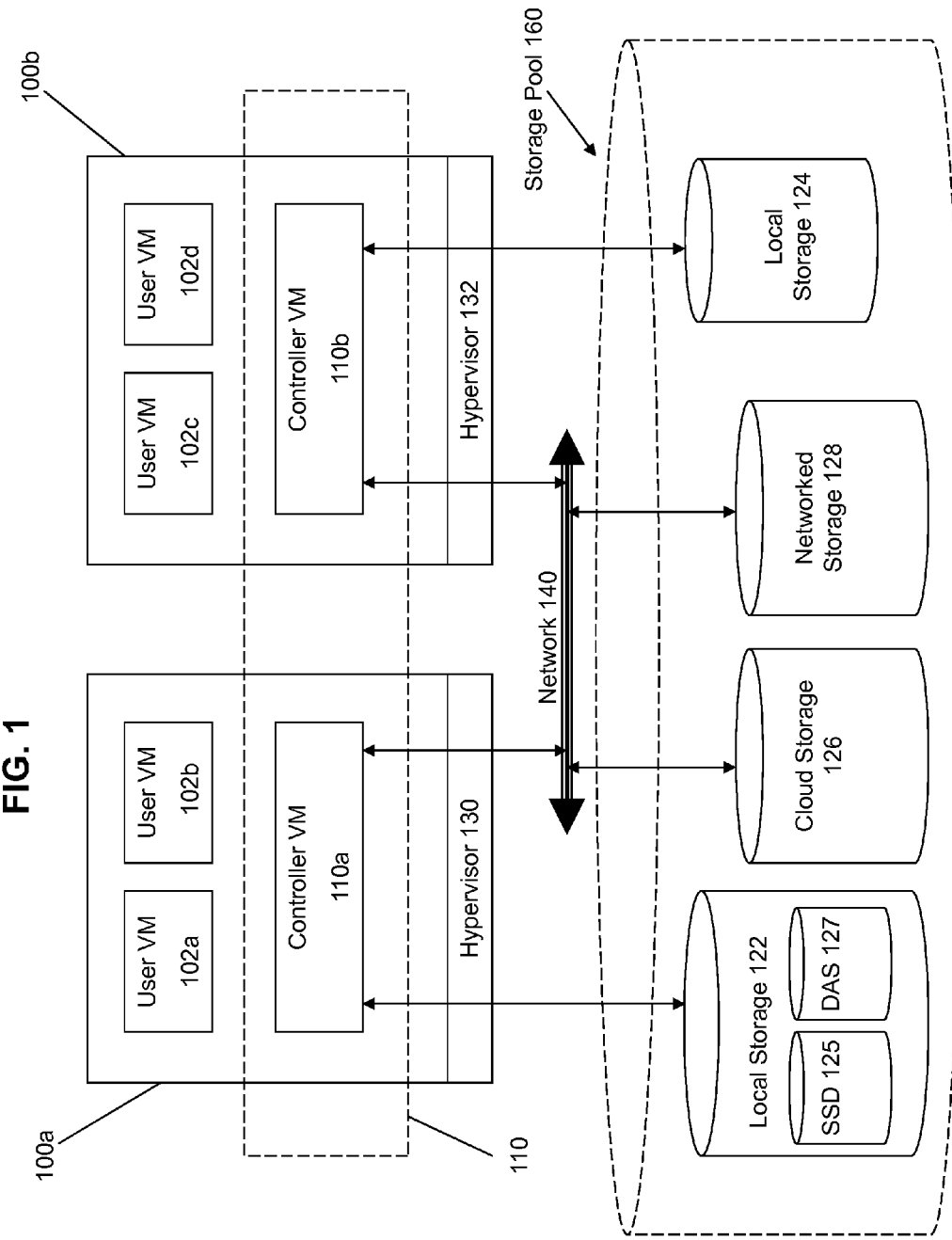
FIG. 1 illustrates a networked virtualization environment for storage management according to some embodiments of the invention.

FIG. 1 illustrates a networked virtualization environment for storage management according to some embodiments of the invention. The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structure from the storage devices in the storage pool 160. As used herein, the term vDisk refers to the storage abstraction that is exposed by a Service or Controller VM to be used by a user VM. In some embodiments, the vDisk is exposed via iSCSI ("Internet Small Computer System Interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM" or "Controller VM". This is the "Storage Controller" in the currently described networked virtualization environment for storage management. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently, such as archival data, can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption and compression. The networked virtualization environment massively parallelizes storage, by placing a storage controller—in the form of a Controller VM—at each hypervisor, and thus makes it possible to render enough CPU and memory resources to achieve the aforementioned optimizations.

Figure 2A:
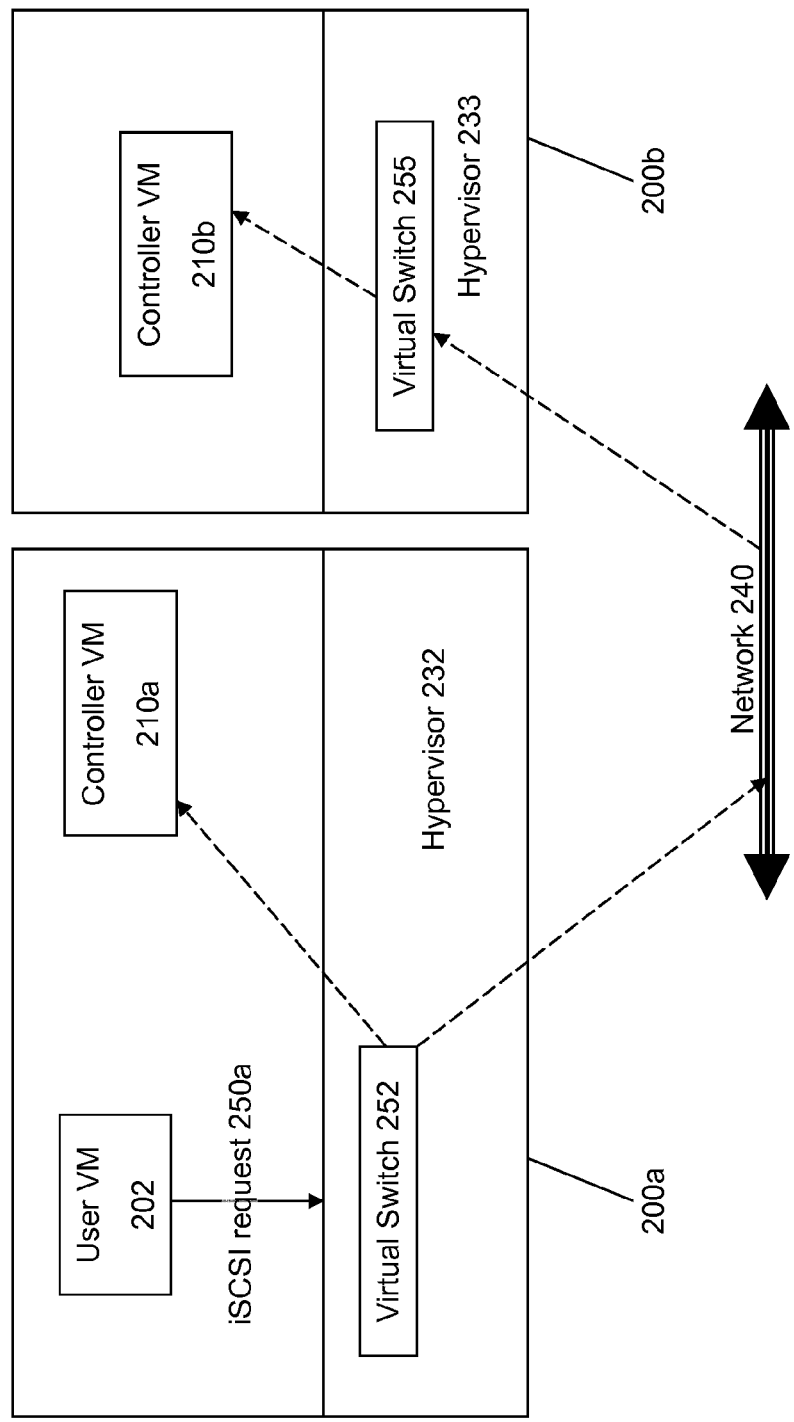
FIGS. 2A to 2C show alternate approaches to implement I/O requests according to some embodiments of the invention.

FIG. 2A illustrates an example approach that can be taken in some embodiments of the invention to submit data communications (e.g., I/O requests) to the Controller VMs 210a/210b from user VMs 202. In this approach, the user VM 202 sends I/O requests 250a to the Controller VMs in the form of iSCSI or NFS requests. The term "iSCSI" or "Internet Small Computer System Interface" refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In another embodiment of the invention, the user VM 202 sends I/O requests 250a to the Controller VMs in the form of NFS requests. The term "NFS" or "Network File System" interface refers to an IP-based file access standard in which NFS clients send file-based requests to NFS servers via a proxy folder (directory) called "mount point". Going forward, this disclosure will interchangeably use the term iSCSI and NFS to refer to the IP-based protocol used to communicate between the hypervisor and the Controller VM. Note that while both protocols are network-based, the currently described architecture makes it possible to use them over the virtual network within the hypervisor. No iSCSI or NFS packets will need to leave the machine, because the communication—the request and the response—begins and ends within the single hypervisor host.

Here, the user VM 202 structures its I/O requests into the iSCSI format. The iSCSI or NFS request 250a designates the IP address for a Controller VM from which the user VM 202 desires I/O services. The iSCSI or NFS request 250a is sent from the user VM 202 to a virtual switch 252 within hypervisor 233 to be sent to the correct destination. If the request is to be intended to be handled by the Controller VM 210a within the same server 200a, then the iSCSI or NFS request 250a is internally routed within server 200a to the Controller VM 210a. As described in more detail below, the Controller VM 210a includes structures to properly interpret and process that request 250a.

It is also possible that the iSCSI or NFS request 250a will be handled by a Controller VM 210b on another server 200b. In this situation, the iSCSI or NFS request 250a may be sent by the virtual switch 252 to the controller VM 201a, which then forwards the request to a real physical switch through the virtual switch 252 to be sent across network 240 to the other server 200b. The virtual switch 255 within the hypervisor 233 on the server 233 may then send the request 250a to the Controller VM 210b for further processing. Alternatively, the iSCSI or NFS request 250a may be sent by the virtual switch 252 to a real physical switch to be sent across network 240 to the other server 200b. Here, the virtual switch 255 within the hypervisor 233 on the server 200b may also send the request 250a to the Controller VM 210b for further processing.

Figure 2B:
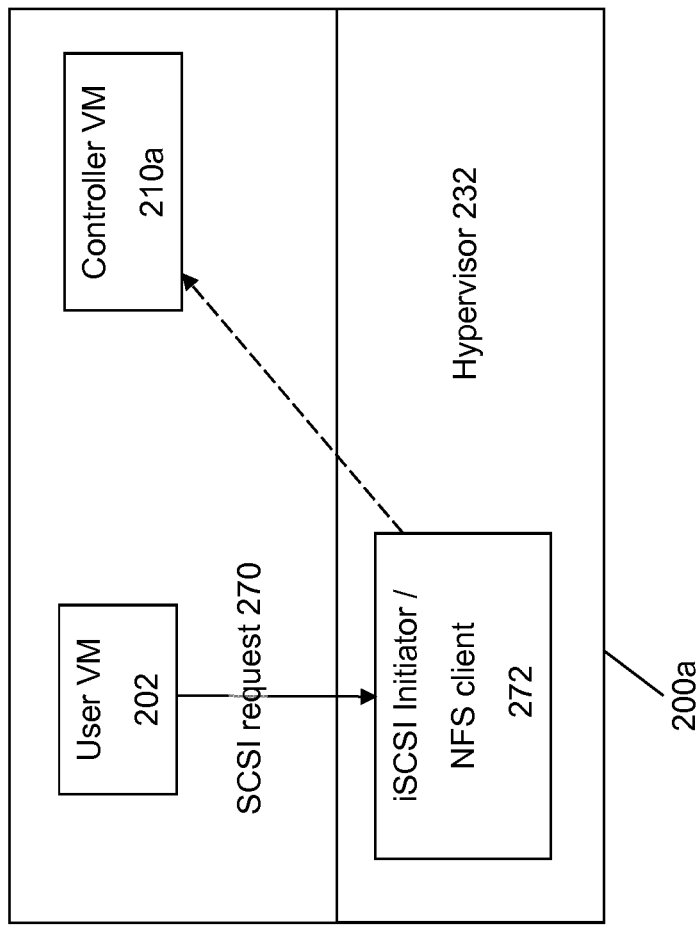

FIG. 2B illustrates an alternate approach in which the data communcations (e.g., I/O requests) from the user VM 202 is in the normal SCSI protocol to a storage device. The hypervisor then converts this SCSI request into an iSCSI or an NFS request as part of its hardware emulation layer. In other words, the virtual SCSI disk attached to the user VM is either an iSCSI LUN or an NFS file in an NFS server. In this approach, an iSCSI initiator 272 or the NFS client software is employed to convert the SCSI-formatted requests into the appropriate iSCSI- or NFS-formatted requests that can be handled by the Controller VM 210a. The advantage of this approach over the approach of FIG. 2A is that there is no need to individually reconfigure or make sure that the software for the user VMs 202 can work with the iSCSI or NFS protocol.

According to some embodiments, the Controller VM runs the Linux operating system. However, it is important to note that the Controller VM is not limited to running the Linux operating system, and may run different operating systems depending on the particular application. As noted above, since the Controller VM exports a block-device or file-access interface to the user VMs, the interaction between the user VMs and the Controller VMs follows the iSCSI or NFS protocol, either directly or indirectly via the hypervisor's hardware emulation layer.

Figure 2C:
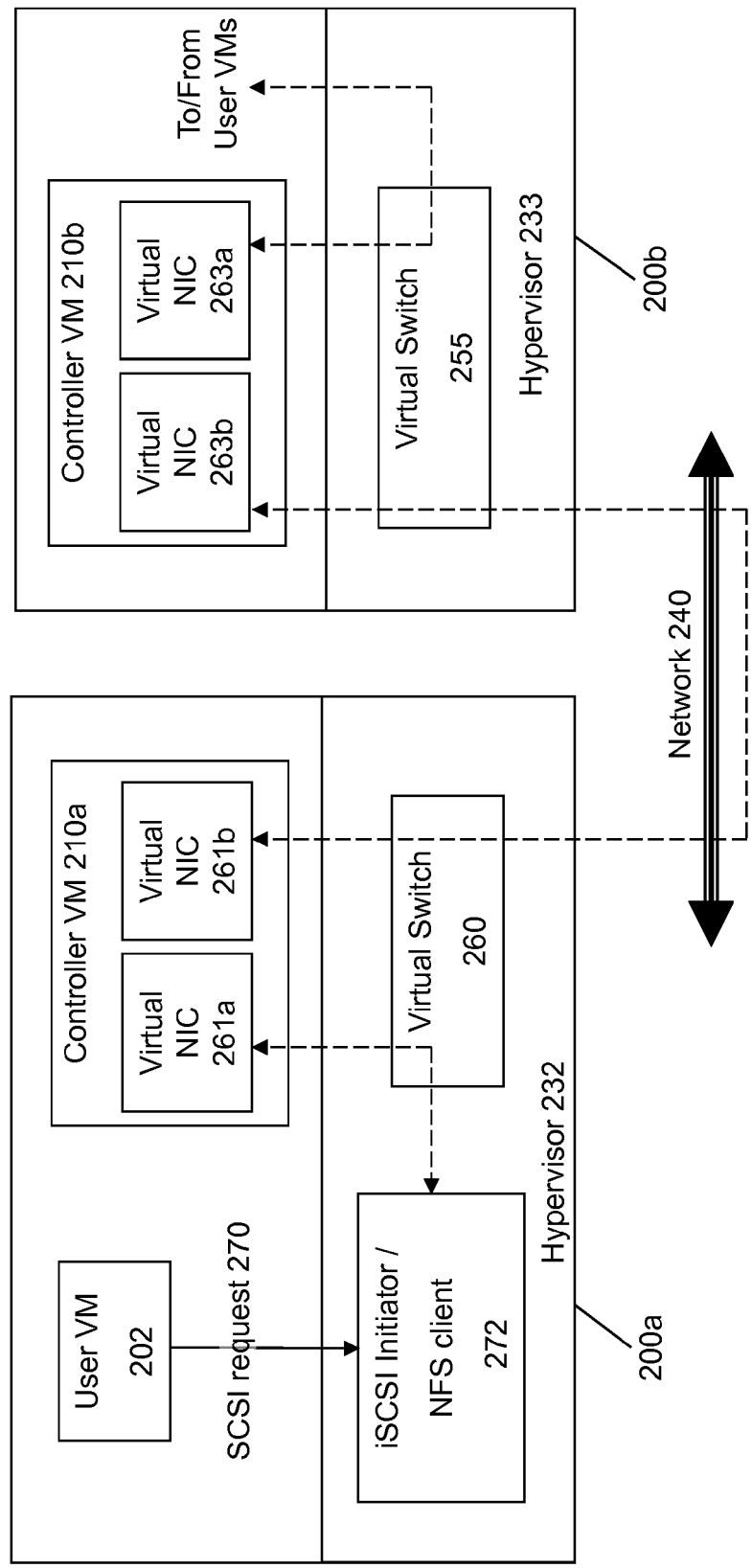

For easy management of the appliance, the Controller VMs all have the same IP address isolated by internal VLANs (virtual LANs in the virtual switch of the hypervisor). FIG. 2C illustrates this aspect of the architecture. The Controller VM 210a on node 200a implements two virtual network interface cards (NICs) 261a and 261b. One of the virtual NICs 261a corresponds to an internal VLAN that permits the User VM 202 to communicate with the Controller VM 210a using the common IP address. The virtual switch 260 would therefore route all communications internal to the node 200a between the User VM 202 and the Controller VM 210a using the first virtual NIC 261a, where the common IP address is managed to correspond to the Controller VM 210a due to its membership in the appropriate VLAN.

The second virtual NIC 261b is used to communicate with entities external to the node 200a, where the virtual NIC 261b is associated with an IP address that would be specific to Controller VM 210a (and no other Controller VM). The second virtual NIC 261b is therefore used to allow Controller VM 210a to communicate with other Controller VMs, such as Controller VM 210b on node 200b. It is noted that Controller VM 210b would likewise utilize VLANs and multiple virtual NICs 263a and 263b to implement management of the appliance.

Additional details regarding networked virtualization environments for storage management are described in related U.S. Pat. No. 8,601,473, issued on Dec. 3, 2013, entitled "Architecture for Managing I/O and Storage for a Virtualization Environment", which is hereby incorporated by reference in its entirety.

Figure 3:
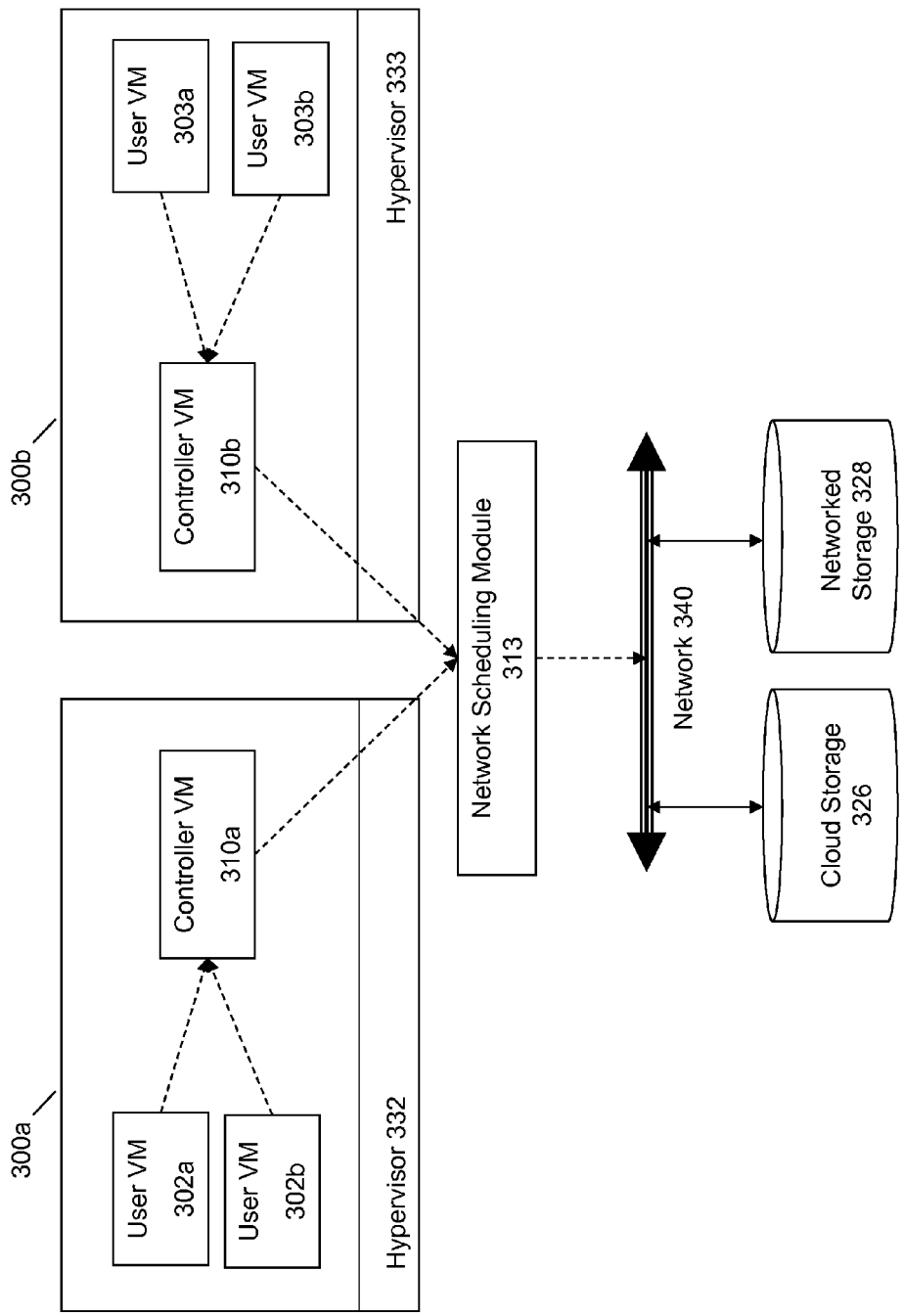
FIG. 3 illustrates a networked virtualization environment for storage management where I/O requests to storage and communications between nodes share the same network according to some embodiments of the invention.

The networked virtualization environment for storage management described above in FIG. 1 allows for both data communications (e.g., I/O requests from user VMs directed to storage devices) as well as control communications (e.g., communications between controller VMs pertaining to control information) to traverse the same network. It is important to note that data communications may involve communicating I/O requests locally within a node or between different nodes in the networked virtualization environment. For example, a controller VM at a given node that receives an I/O request from a user VM may forward the I/O request to another controller VM at another node to be fulfilled. FIG. 3 illustrates a simplified representation of the networked virtualization environment for storage management where I/O requests issued by user VMs and communications issued by controller VMs share the same network according to some embodiments of the invention.

In FIG. 3, the networked virtualization environment for storage management includes node 300a and node 300b as well as storage accessible through a network such as cloud storage 326 or networked storage 328 (e.g., a SAN or "storage area network"). Node 300a implements a virtualization environment via hypervisor 332 that includes a controller VM 310a that services two different user VMs 302a, 302b. Likewise, node 300b implements a virtualization environment via hypervisor 333 that includes a controller VM 310b that services two different user VMs 303a, 303b.

Nodes 300a and 300b are connected to form the networked virtualization environment for storage management via network 340. A network scheduling module 313 associated with the network 340 is utilized to perform scheduling of any network communications.

Although only two nodes 300a, 300b are depicted in the networked virtualization environment for storage management of FIG. 3, it is important to note that the networked virtualization environment for storage management may be extended to include any number of nodes. Similarly, although only two user VMs 302a, 302b, 303a, 303b are depicted for each node in the networked virtualization environment for storage management of FIG. 3, it is important to note that the networked virtualization environment for storage management may be extended to include any number of user VMs for a node.

In the networked virtualization environment for storage management depicted in FIG. 3, different types of network communications may traverse the network 340. Such network communications may include data communications (e.g., I/O requests issued by user VMs 302a, 302b, 303a, 303b) as well as control communications (e.g., communications issued between controller VMs 310a, 310b pertaining to control information). Data communications (e.g., I/O requests) issued by user VMs 302a, 302b, 303a, 303b are first directed at their corresponding controller VM 310a, 310b prior to traversing the network 340, in the manner described above. Control communications issued between controller VMs 310a may be directly passed to the network scheduling module 313 for scheduling.

Network communications made by controller VMs 310a, 310b may include communications directed at storage devices 326, 328 of the networked virtualization environment as well as inter-node communications between controller VMs 310a, 301b pertaining to control information. Said otherwise, network communications made by controller VMs 310a, 310b may include both data communications as well as control communications. Such data communications (e.g., user VM issued network communications directed at storage devices of the networked virtualization environment) may include, for example, read/write requests directed at local storage devices, networked storage devices, or storage devices local to a node other than the one where the requesting user VM resides (e.g., storage devices being managed by a controller VM other than the controller VM associated with the requesting user VM). On the other hand, control communications (e.g., inter-node communications between controller VMs 310a, 310b pertaining to control information) may include, for example, health status requests and heartbeats.

Figure 4A:
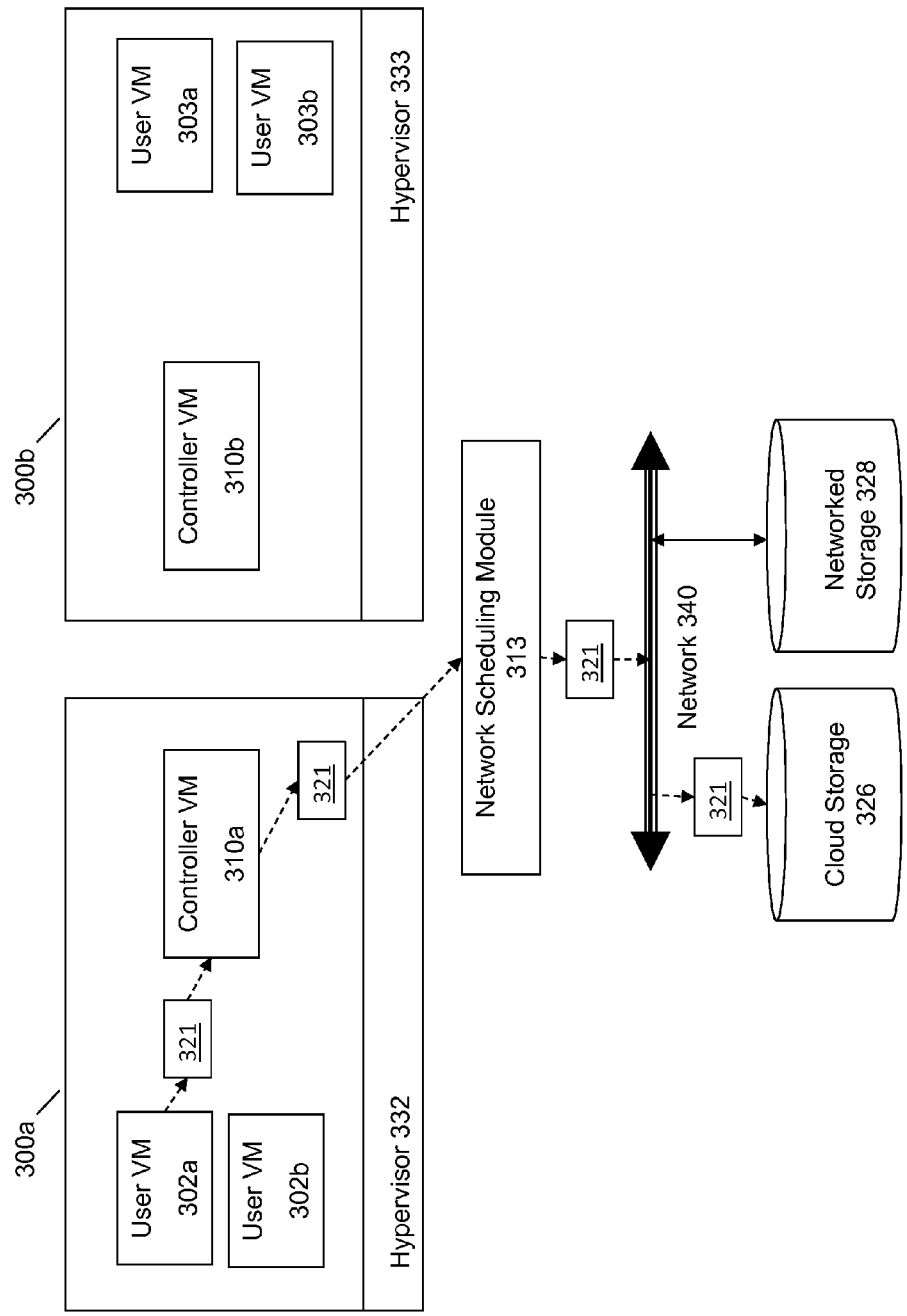
FIG. 4A illustrates an example of a data communication traversing the network in the networked virtualization environment for storage management of FIG. 3

FIG. 4A illustrates an example of a data communication traversing the network in the networked virtualization environment for storage management of FIG. 3. In FIG. 4A, user VM 302a issues a data communication 321 in the form of an I/O request for cloud storage device 326. The data communication 321 is initially passed from user VM 302a to its corresponding controller VM 310a. The controller VM 310a then passes the data communication 321 to the network scheduling module 313, which schedules the data communication 321 and forwards the data communication 321 to the cloud storage device 326 through the network 340.

Figure 4B:
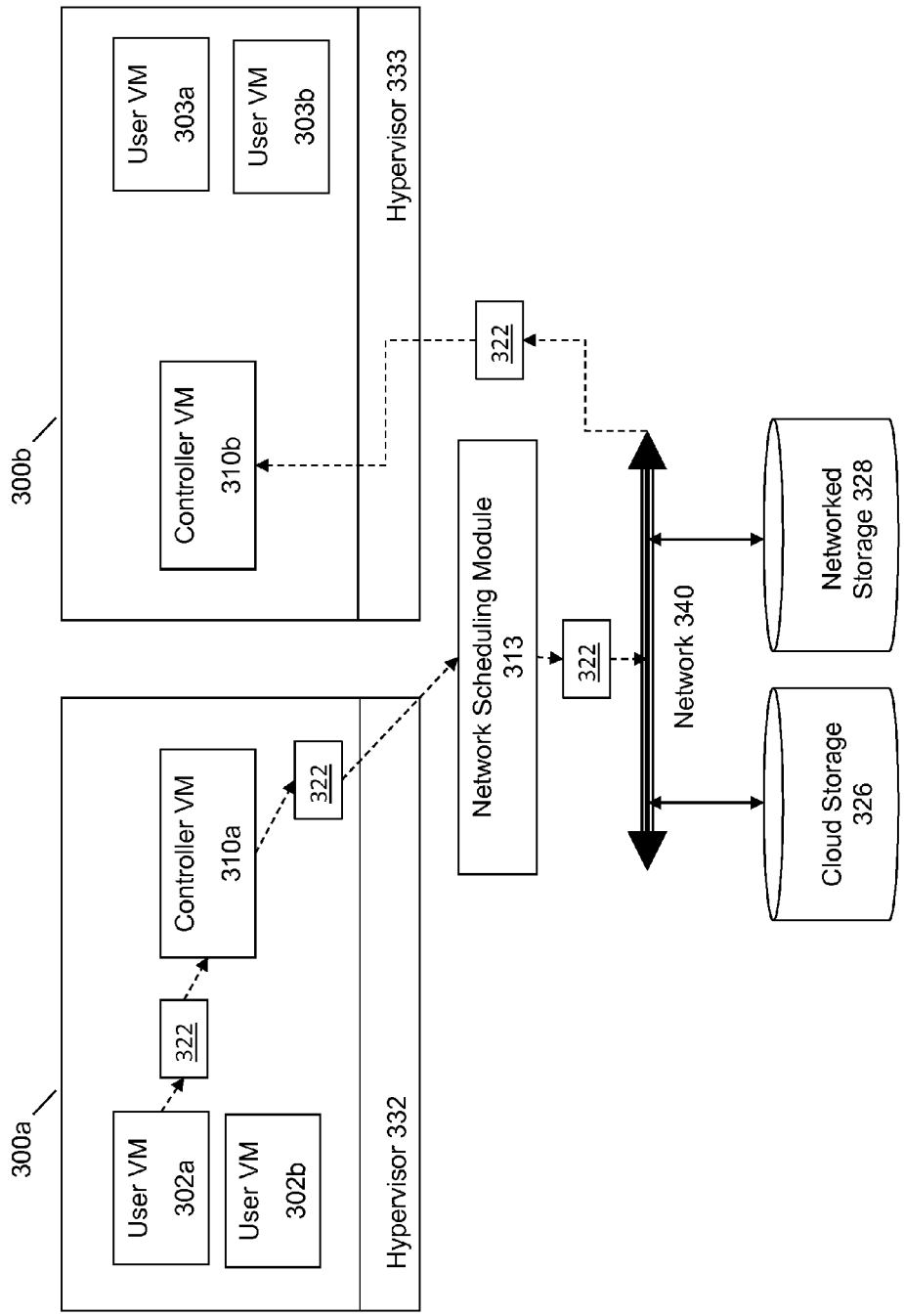
FIG. 4B illustrates another example of a data communication traversing the network in the networked virtualization environment for storage management of FIG. 3

FIG. 4B illustrates another example of a data communication traversing the network in the networked virtualization environment for storage management of FIG. 3. In FIG. 4B, user VM 302a issues a data communication 322 in the form of an I/O request for a storage device being managed by controller VM 310b. The data communication 322 is initially passed from user VM 302a to its corresponding controller VM 310a. The controller VM 310a then passes the data communication 322 to the network scheduling module 313, which schedules the data communication 322 and forwards the data communication 322 to controller VM 310b through the network 340.

Although not illustrated in FIG. 4B, upon receiving the data communication 322, controller VM 310b may service the data communication 322 locally, or may alternatively forward the data communication 322 back to the network scheduling module 313 for scheduling where the data communication is directed to a networked storage device (e.g., cloud storage 326 or networked storage 328) being managed by controller VM 310b.

Figure 4C:
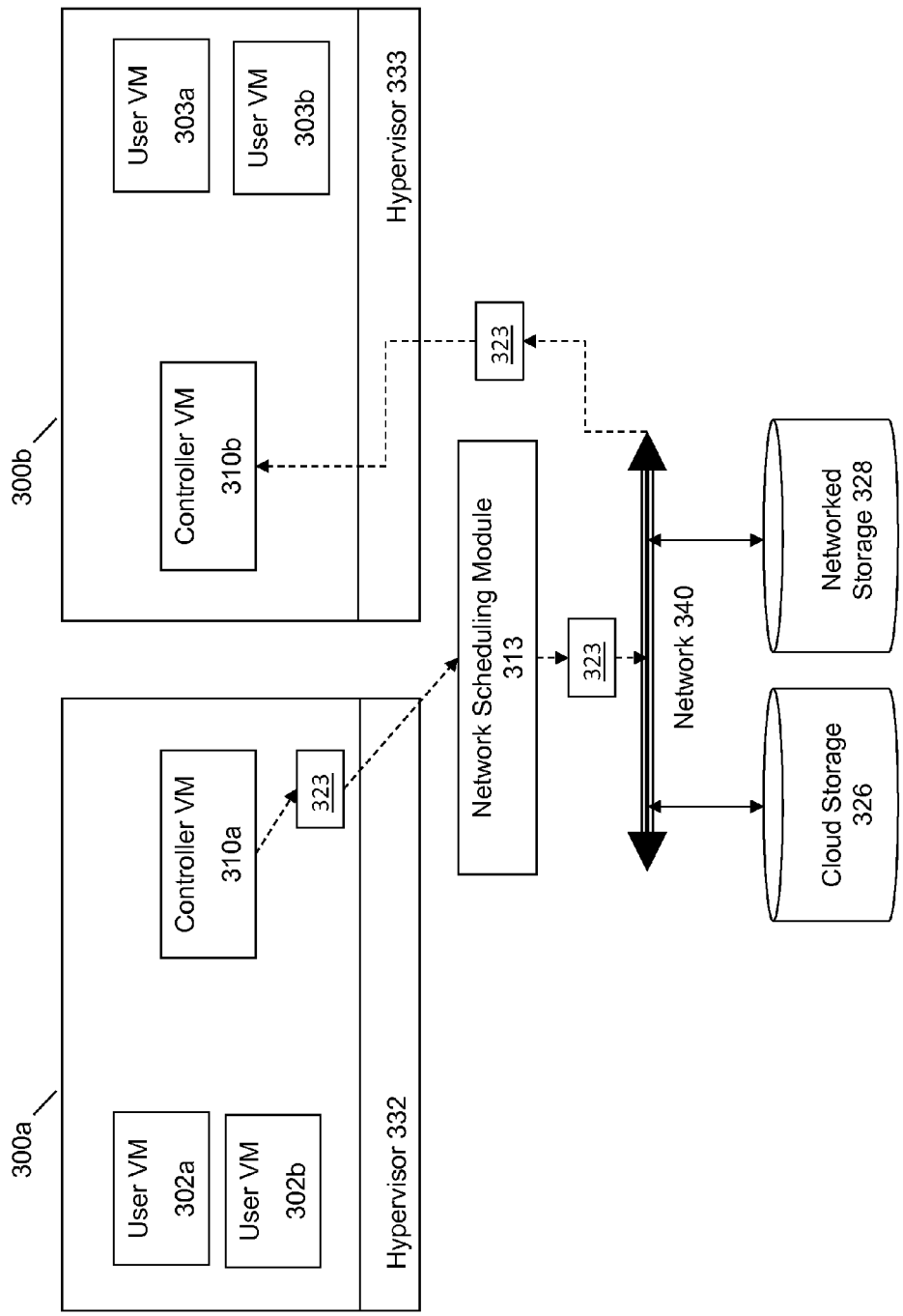
FIG. 4C illustrates an example of a control communication traversing the network in the networked virtualization environment for storage management of FIG. 3

FIG. 4C illustrates an example of a control communication traversing the network in the networked virtualization environment for storage management of FIG. 3. In FIG. 4B, controller VM 310a issues a control communication 323 for controller VM 310b. The control communication 323 is passed from controller VM 310a to the network scheduling module 313, which schedules the control communication 323 and forwards the control communication 323 to controller VM 310b through the network 340.

Because various forms of network communication (e.g., data communications and control communications) may traverse the network 340, there is a need to provide a mechanism for implementing QoS for the networked virtualization environment for storage management that allows for all network communications to be properly prioritized. User VMs 302a, 302b, 303a, 303b may be associated with QoS policies that provide service level guarantees and controller VM issued control communications may be associated with a corresponding prioritization scheme. Additionally, QoS policies may change over time, such that QoS policies associated with User VMs 302a, 302b, 303a, 303b may be different at different periods of time. As such, a QoS implementation for the networked virtualization environment should allow for user VMs to be provided with storage functionality that aligns with the service level guarantees defined by their QoS policies and also allow for controller VM issued control communications to be handled in an efficient and optimal manner.

As mentioned above, quality of service (QoS) policies that provide certain service level guarantees may be associated with user VMs 302a, 302b, 303a, 303b within the networked virtualization environment. Users may purchase different QoS policies that provide varying levels of service for varying prices. In this way, user VMs 302a, 302b, 303a, 303b running within the networked virtualization environment may define certain parameters associated with the level of service they are provided. Parameters defined for a QoS policy associated with a user VM may include time delay, jitter, minimum bandwidth allocated and maximum bandwidth allocated.

Time delay indicates the allowed delay for fulfilling I/O requests issued by a user VM. A more expensive QoS policy may include a shorter guaranteed time delay for fulfilling I/O requests issued by the user VM, while a less expensive QoS policy may include a longer guaranteed time delay for fulfilling I/O requests issued by the user VM.

Jitter indicates the rate of variance in time delay. A more expensive QoS policy may allow for a smaller magnitude of jitter while a less expensive QoS policy may allow for a greater magnitude of jitter.

Minimum bandwidth allocated indicates the minimum amount of network bandwidth to be allocated to a user VM at any given time for fulfilling I/O requests. A more expensive QoS policy may guarantee a greater minimum bandwidth to a user VM, while a less expensive QoS policy may guarantee a lesser minimum bandwidth to the user VM. Similarly, maximum bandwidth allocated indicates the maximum amount of network bandwidth to be allocated to a user VM at any given time for fulfilling I/O requests. A more expensive QoS policy may provide for a greater maximum bandwidth to a user VM, while a less expensive QoS policy may provide for a lesser maximum bandwidth to the user VM.

Although only time delay, jitter, minimum bandwidth and maximum bandwidth have been provided as examples parameters for defining a QoS policy, one ordinarily skilled in the art will recognize that various other parameters may also be used for defining a QoS policy. Additionally, QoS policies may be associated with user VMs in a hierarchical fashion. For example, subsets of user VMs may be associated with different customers, where each customer is provided with a QoS policy that is associated with its particular subset of user VMs. In this way, different customers sharing the same networked virtualization environment for storage management may be associated with different QoS policies.

In a similar manner, prioritization schemes may also be associated with controller VM issued control communications. While controller VMs may not be provided with price-based service level guarantees, different types of controller VM issued control communications may be granted different levels of prioritization. For example, a request to perform disk scrubbing or de-duplication by a controller VM may be granted a lower prioritization than a heartbeat response provided by a controller VM.

What is needed, therefore, is a mechanism for allowing a network scheduling module to distinguish between data communications and control communications that traverse the same network and provide prioritization to such data communications and control communications in a manner that satisfies both user VM QoS policies and prioritization schemes associated with service VM issued control communications.

Figure 5:
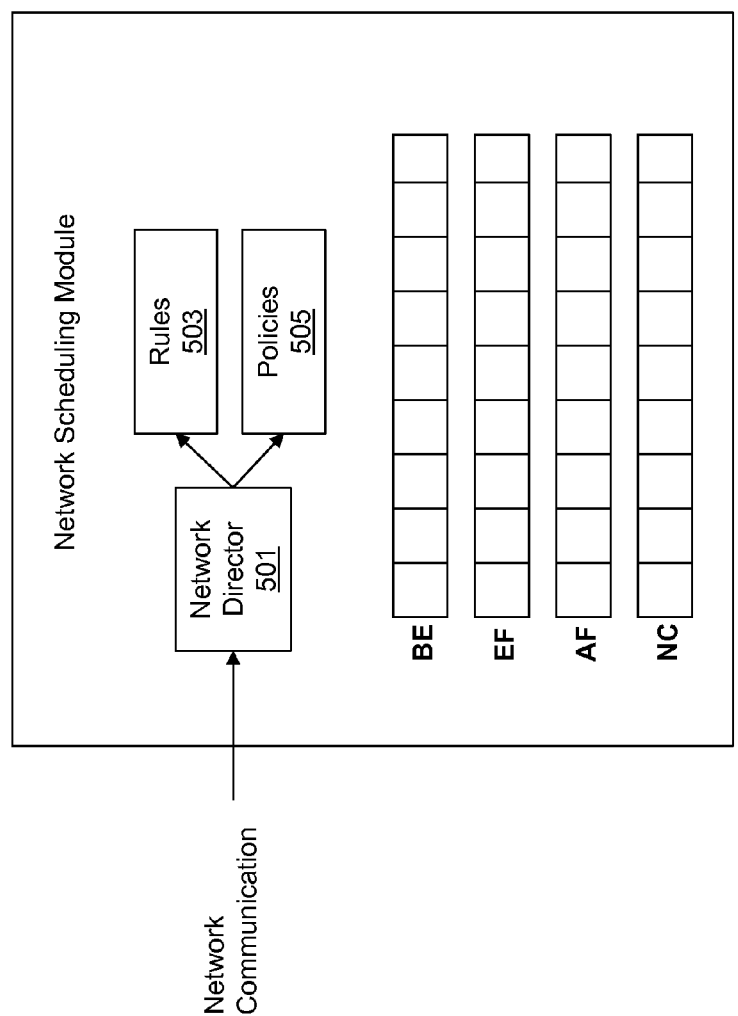
FIG. 5 illustrates components of a network scheduling module for a networked virtualization environment for storage management according to some embodiments of the invention.

FIG. 5 illustrates components of a network scheduling module for a networked virtualization environment for storage management according to some embodiments of the invention. The network scheduling module of FIG. 5 is one embodiment of the network scheduling module depicted in FIG. 3.

The network scheduling module may include a network director 501. The network director 501 is configured to receive network communications and to prioritize the network communications in a manner which will be described in greater detail below. As mentioned above, such a network communication may be a data communication (e.g., user VM issued I/O request) or a controller VM issued control communication.

The network scheduling module may also include several queues 507. Each queue 507 may be associated with a prioritization class, and each prioritization class may be allocated network resources in a different manner. The network scheduling module in FIG. 5 includes four queues that are associated with four different prioritization classes (e.g., BE, EF, AF and NC), however, it is important to note that any number of prioritization classes may be utilized.

Additionally, multiple queues may be associated with each prioritization class. In some embodiments where multiple queues are associated with a prioritization class, each queue within the prioritization class may be provided a different guaranteed minimum bandwidth, maximum bandwidth and also a policy for handling network communications once the guaranteed minimum bandwidth is satisfied. Thus, associating multiple queues with a prioritization class allows for different network communications to be provided different scheduling policies even though they are placed in the same class.

The four queues depicted in FIG. 5 are associated with four different prioritization classes, namely a best efforts (BE) prioritization class, an expedited forwarding (EF) prioritization class, an assured forwarding (AF) prioritization class and a network control (NC) prioritization class.

Network communications residing in a queue associated with a best efforts (BE) prioritization class are not guaranteed any priority. Best efforts (BE) prioritization class traffic are provided variable transmission rates and delivery times depending on the current load of the network. Network communications of low importance and/or minimal time constraints may be placed in a best efforts (BE) prioritization class queue.

Network communications residing in a queue associated with an expedited forwarding (EF) prioritization class are typically characterized by low delay, low loss and low jitter. Expedited forwarding (EF) class traffic is typically given priority above most other prioritization classes. Network communications of higher importance and/or having short time constraints may be placed in an expedited forwarding (EF) prioritization class queue.

Network communications residing in a queue associated with an assured forwarding (AF) prioritization class are typically characterized by minimal loss so long as the rate of incoming network communications does not exceed a subscribed rate. Network communications of high importance may be placed in an assured forwarding (AF) prioritization class queue in order to ensure that those network communications will not be lost.

Network communications residing in a queue associated with a network control (NC) prioritization class are typically characterized by minimal delay, minimal jitter and minimal loss. Network control (NC) class traffic is typically given priority above all other prioritization classes. Network communications of very high importance and/or having minimal time constraints may be placed in a network control (NC) prioritization class queue to ensure that those network communications will be processed in the most efficient manner.

The network scheduling module may also include a set of rules 503 and a set of policies 505. The set of policies 505 may include both QoS policies associated with user VMs as well as prioritization schemes for controller VM issued control communications. The set of rules 503 may include one or more guidelines to be utilized by the network director 501 for determining how network communications having particular QoS policies or prioritization schemes are to be categorized into the different prioritization class queues. Further details describing how network communications are categorized into the different prioritization class queues will be described below.

Figure 6:
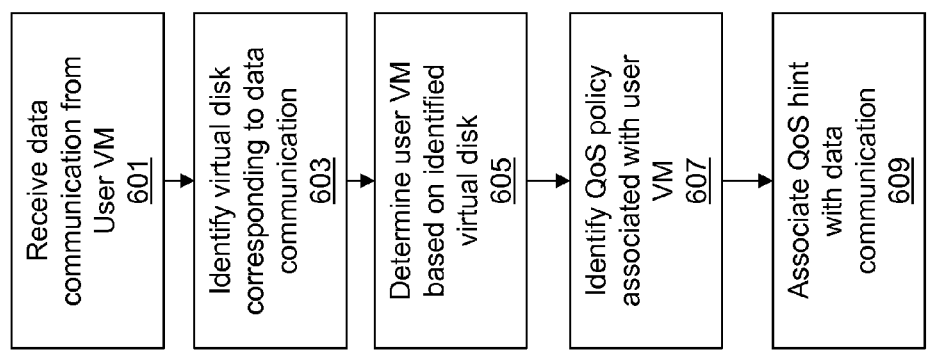
FIG. 6 is a flow diagram illustrating a method for associating quality of service (QoS) hints with an I/O request according to some embodiments of the invention.

As mentioned above, before a user VM issued data communication (e.g., I/O request) reaches the network scheduling module, the user VM issued data communication is first received by its corresponding controller VM. The controller VM may analyze the user VM issued data communication and associate a QoS policy hint with the data communication in a manner that allows for subsequent scheduling of the data communication to be more efficiently handled. FIG. 6 is a flow diagram illustrating a method for associating quality of service (QoS) hints with a data communication (e.g., I/O request) according to some embodiments of the invention.

Initially, a controller VM for a node in the networked virtualization environment receives a data communication from a user VM as shown at 601. In some embodiments, the data communication issued by the user VM is directed at virtual storage devices managed by its corresponding controller VM. In other embodiments, the data communication issued by the user VM is directed at virtual storage devices managed by another controller VM in the networked virtualization environment for storage management.

Regardless of whether the data communication issued by the user VM is directed at virtual storage devices managed by its corresponding controller VM or another controller VM in the network, the data communication must traverse the network. In the situation where the issued data communication is directed at virtual storage devices managed by its corresponding controller VM, the data communication will simply traverse the network to access physical storage devices corresponding to the virtual storage devices. Alternatively, in the situation where the issued data communication is directed at virtual storage devices managed by another controller VM, the data communication will first traverse the network to reach the other controller VM. The data communication may then be fulfilled locally by the other controller VM or it may traverse the network a second time to access physical storage devices corresponding to the virtual storage devices managed by the other controller VM.

Because the user VM has a QoS policy that provides certain service level guarantees, the issued data communication must be properly prioritized for network access regardless of whether the network access is provided for accessing physical storage devices or for reaching the other controller VM.

When the controller VM receives the data communication, it first identifies the virtual disk corresponding to the data communication as shown at 603. In some embodiments, the data communication may include an indication of the virtual disk and offset within the virtual disk where the data communication is to be fulfilled. The controller VM may identify the virtual disk by simply extracting that information from the data communication.

The controller VM then determines the user VM issuing the data communication based on the identified virtual disk as shown at 605. The networked virtualization environment is configured such that virtual disks associated with user VMs are unique, and so by identifying the virtual disk at which the data communication is directed, the user VM that issued the I data communication may be determined.

Each controller VM within the networked virtualization environment may have access to distributed metadata that maps virtual disks to user VMs. The controller VM may simply perform a lookup in the distributed metadata to determine which user VM corresponds to the virtual disk at which the data communication is directed.

Once the controller VM has determined the user VM which issued the data communication, the controller VM may then identify a QoS policy associated with the user VM as shown at 607. As mentioned above, user VMs operating within the networked virtualization environment for storage management may purchase QoS policies that provide certain service level guarantees. The QoS policies for user VMs may also be stored as distributed metadata accessible to the controller VMs. The controller VM may simply perform a lookup in the distributed metadata to identify the QoS policy associated with the user VM issuing the data communication.

The controller VM may then associate a QoS hint with the data communication as shown at 609. The QoS hint will remain associated with the I/O request until the data communication is fulfilled. The QoS hint may be some indication that allows for the network scheduling module to subsequently identify the QoS policy associated with the user VM issuing the data communication. For example, the QoS hint may be a key or hash value that allows the network scheduling module to quickly lookup the corresponding QoS policy associated with the user VM issuing the data communication.

By associating a QoS hint with a data communication, the data communication may be properly prioritized each time it traverses the network until the data communication is fulfilled. For example, a data communication directed at virtual storage devices managed by a controller VM other than its corresponding controller VM will be prioritized in accordance with its QoS policy for both network access to reach the other controller VM and also network access to reach physical storage devices corresponding to the virtual storage devices.

Additionally, where the data communication is directed at local storage devices such that the data communication need not traverse the network, the QoS hint may still be utilized by schedulers associated with the local storage devices to properly prioritize the data communication. For example, where a user VM issuing a data communication directed at local storage device has a QoS policy that allows for significant delay, the scheduler associated with the local storage device may identify that QoS policy using the QoS hint and place the I data communication at the end of the queue for accessing the local storage device. Alternatively, where a user VM issuing a data communication directed at a local storage device has a QoS policy that requires minimal delay, the scheduler associated with the local storage device may identify that QoS policy using the QoS hint and place the data communication at the front of the queue for accessing the local storage device.

All network communications received by the network scheduling module must be placed into queues prior to traversing the network. The queues may be associated with different prioritization classes that are allocated network resources differently, as described above. The network scheduling module must be able to differentiate between data communications (e.g., user VM issued I/O requests) as well as controller VM issued control communications and properly prioritize those communications. The network communications must be prioritized by the network scheduling module such that user VM issued data communications (e.g., I/O requests) are handled in accordance with the QoS policy associated the user VM and controller VM issued control communications are handled in accordance with their corresponding prioritization schemes.

Figure 7:
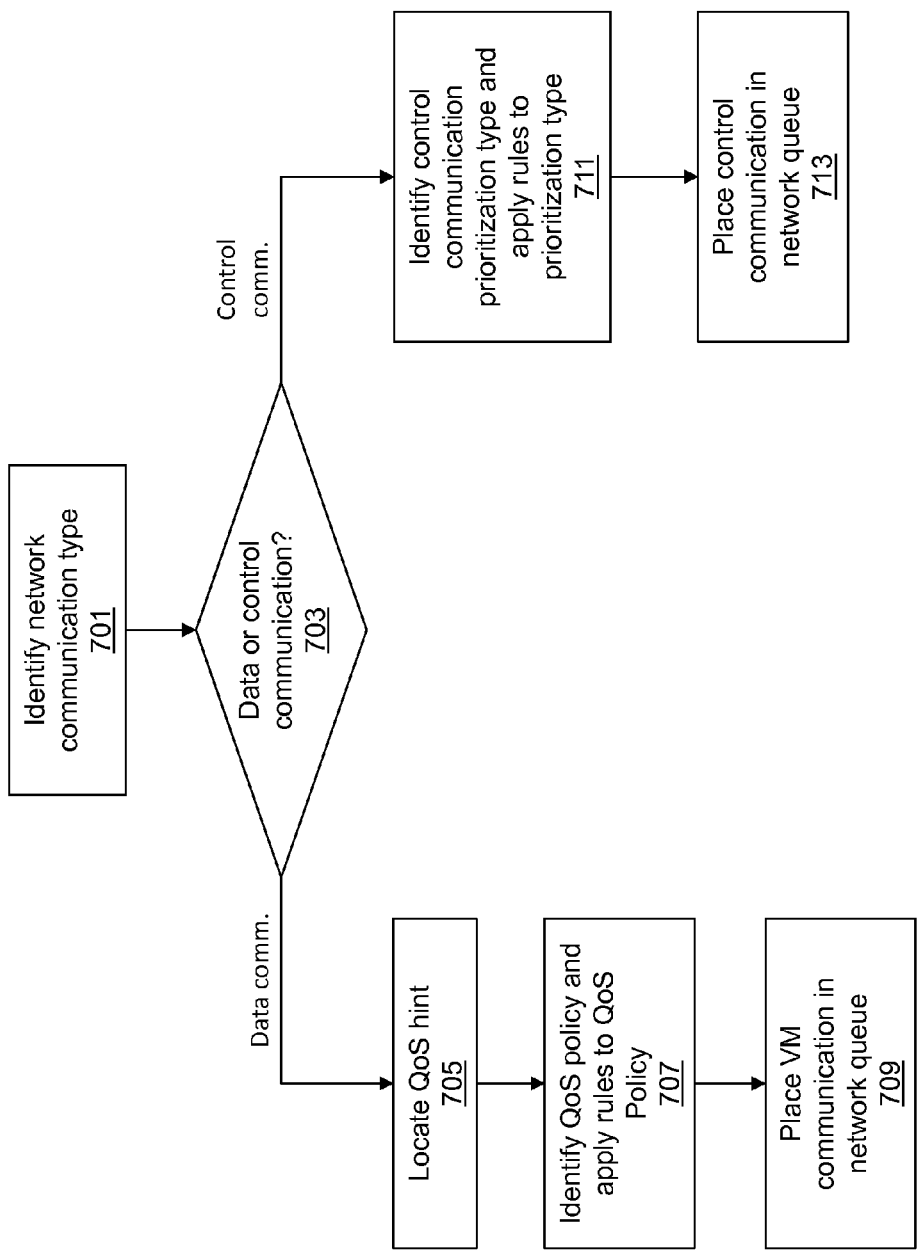
FIG. 7 is a flow diagram illustrating a method for implementing quality of service (QoS) for network communications in a networked virtualization environment for storage management according to some embodiments of the invention.

FIG. 7 is a flow diagram illustrating a method for implementing quality of service (QoS) for network communications in a networked virtualization environment for storage management according to some embodiments of the invention. The flow diagram of FIG. 7 illustrates the method performed by the network scheduling module for prioritizing network communications.

Initially, the network scheduling module receives a network communication as shown at 701. As mentioned above, the network communication may be a data communication (e.g., I/O request issued by a user VM) or alternatively may be a controller VM issued control communication. The data communication may require network access to reach the other controller VM or to reach physical storage devices corresponding to the virtual storage devices at which the data communication is directed. Similarly, the controller VM issued control communication may require network access to reach another controller VM or to access the physical storage devices.

The network scheduling module then determines whether the network communication is a data communication or a control communication as shown at 703. In some embodiments, the network scheduling module may determine whether the network communication data communication or control communication based on the network communication type (e.g., I/O request, health status check, etc.). In other embodiments, the network scheduling module may determine the type of network communication by identifying the origin of the network communication by simply locating an identification of the source of the network communication in the network communication packet.

If the network scheduling module determines that the network communication is a data communication, the network scheduling module locates the QoS hint associated with the network communication as shown at 705. The QoS hint associated with the data communication will allow the network scheduling module to identify the QoS policy associated with the user VM that issued the data communication.

After the network scheduling module locates the QoS hint, it identifies the QoS policy associated with the user VM that issued the data communication, and then applies a set of rules to the QoS policy as shown at 707. The network communication is then placed into an appropriate position in an appropriate prioritization class queue based on the application of the set of rules to the QoS policy associated with the user VM that issued the data communication as shown at 709.

The set of rules may include one or more guidelines to be utilized by the network director of the network scheduling module for determining how network communications are to be categorized into the different prioritization class queues. For example, applying the set of rules to a QoS policy of a user VM that requires minimal delay and minimal jitter may result in placing the data communication issued by that user VM at the front of a queue belonging to a high prioritization class (e.g., expedited forwarding (EF) prioritization class). As another example, applying the set of rules to a QoS policy of a user VM that allows for significant delay and significant jitter may result in placing the data communication issued by that user VM at the end of a queue belonging to a low prioritization class (e.g., best efforts (BE) prioritization class). Additional details describing how network communications are categorized into the different prioritization class queues will be described below.

If instead the network scheduling module determines that the network communication is a control communication issued by a controller VM, the network scheduling module identifies a control communication prioritization type for the controller VM issued control communication using a prioritization scheme associated with controller VM issued control communications, and then applies a set of rules to the control communication prioritization type associated with controller VM issued control communication as shown at 711. The control communication is then placed into an appropriate position in an appropriate prioritization class queue based on the application of the set of rules to the control communication prioritization type associated with controller VM issued control communication as shown at 713.

The set of rules may include one or more guidelines to be utilized by the network director of the network scheduling module for determining how control communications issued by controller VMs are to be categorized into the different prioritization class queues. For example, the prioritization scheme may indicate that the control communication issued by the controller VM is of a high priority type (e.g., heartbeat response) and applying the set of rules to the control communication prioritization type may result in placing the control communication issued by that controller VM at the front of a queue belonging to a high prioritization class (e.g., expedited forwarding (EF) prioritization class). As another example, the prioritization scheme may indicate that the control communication issued by the controller VM is of a low priority type (e.g., de-duplication) and applying the set of rules to the control communication prioritization type may result in placing the control communication issued by that controller VM at the end of a queue belonging to a low prioritization class (e.g., best efforts (BE) prioritization class). Additional details describing how network communications are categorized into the different prioritization class queues will be described below.

Figure 8:
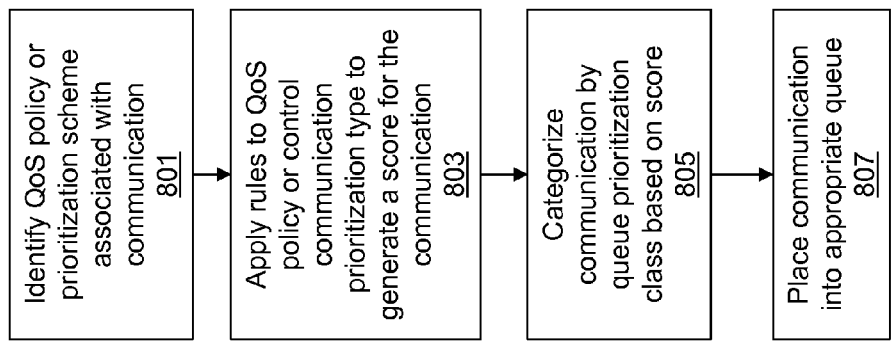
FIG. 8 is a flow diagram illustrating a method for prioritizing network communications in a networked virtualization environment for storage management according to some embodiments of the invention.

FIG. 8 is a flow diagram illustrating a method for prioritizing network communications in a networked virtualization environment for storage management according to some embodiments of the invention. The flow diagram of FIG. 8 illustrates a method for applying a set of rules to a QoS policy or a control communication prioritization type for categorizing network communications into appropriate positions of prioritization class queues.

When a network communication is received by the network director of the network scheduling module, a QoS policy associated with the user VM issuing a data communication or a prioritization scheme associated with a controller VM issued control communications is identified as shown at 801.

When the network communication is a data communication (e.g., user VM issued I/O request), the QoS policy associated with the issuing user VM is identified. The QoS policy will include a set of parameters that define the service level guarantees for that user VM. As described above, the parameters may include a time delay, jitter, minimum bandwidth and maximum bandwidth to be associated with data communications issued by the user VM.

When the network communication is a controller VM issued control communication, the prioritization scheme associated with controller VM issued control communications is identified. The prioritization scheme will indicate how different control communications are categorized into different control communication priority types. For example, the prioritization scheme may indicate that a health status request or heartbeat response is categorized into a high priority type while also indicating that a de-duplication or disk cleaning request is categorized into a low priority type.

Rules are then applied to the identified QoS policy parameters or control communication prioritization type to generate a score for the network communication as shown at 803.

When the network communication is a data communication (e.g., user VM issued I/O request), a set of rules are applied to the identified QoS policy parameters for that user VM in order to generate a score for the user VM issued I/O Request. Various different algorithms may be applied to the QoS policy parameters to generate a score for the user VM issued I/O request. For example, each QoS policy parameter may be given a weight and QoS policy parameter values may be multiplied by their weight and aggregated to generate a score.

When the network communication is a controller VM issued control communication a set of rules are applied to the identified control communication priority type for that controller VM issued control communication in order to generate a score for that controller VM issued network communication. Various different algorithms may be applied to the control communication priority type to generate a score for the controller VM issued network communication. For example, the control communication priority type may be associated with a set of parameter values which are then weighted and scored.

Scores for both data communications and controller VM issued control communications may be normalized so that they be compared and categorized.

After a score has been generated for the network communication, the network communication is categorized into a queue prioritization class based on the score as shown at 805. In some embodiments, each prioritization class may be associated with a certain range of scores and network communications are categorized according to the range within which their score falls into. Network communications having high scores that correspond to high priority may be categorized in a high prioritization class such as a network control (NC) class or an expedited forwarding (EF) class. Network communications having lower scores that correspond to lower priorities may be categorized in a low prioritization class such as an assured forwarding (AF) class or best efforts (BE) class.

Once categorized, the network communication may then be placed into a proper position within the queue associated with its corresponding prioritization class as shown at 807. In some embodiments, the network communication is placed into different positions within the queue based on where the score for the network communication falls within the range of scores associated with that prioritization class. For example, a network communication having a score that is closer to the high end of the range associated with its prioritization class may be placed in a position closer to the front of the queue corresponding to that prioritization class. A network communication having a score that is closer to the low end of the range associated with its prioritization class may be placed in a position closer to the end of the queue corresponding to that prioritization class.

By identifying, scoring and categorizing all network communications that are to traverse the network of the networked virtualization environment for storage management, the network communications may be handled in a manner that aligns with user VM QoS policies and controller VM network communication prioritization schemes.

FIGS. 9A to 9G are schematic diagrams illustrating a method for implementing quality of service (QoS) for network communications in a networked virtualization environment for storage management according to some embodiments of the invention.

Figure 9A:
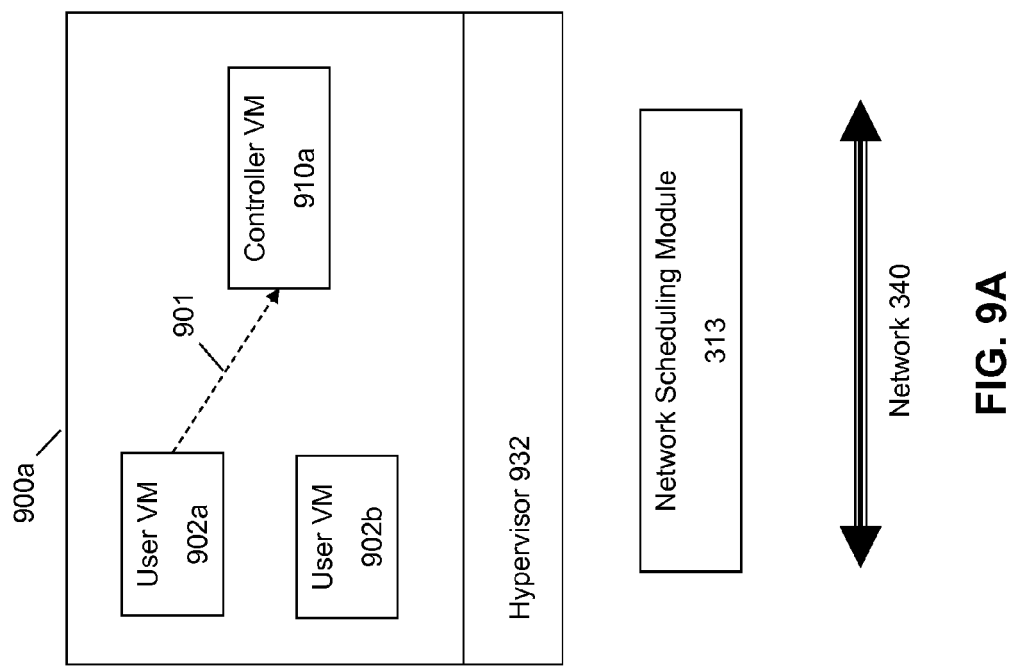
FIGS. 9A to 9G are schematic diagrams illustrating a method for implementing quality of service (QoS) for network communications in a networked virtualization environment for storage management according to some embodiments of the invention.

As depicted in FIG. 9A, the networked virtualization environment for storage management includes a node 900a that implements a virtualization environment via hypervisor 932 that includes a controller VM 910a that services two different user VMs 902a, 902b. For purposes of simplicity, only a single node is illustrated, however one ordinarily skilled in the art will recognize that the networked virtualization environment may include any number of nodes. The networked virtualization environment also includes a network scheduling module 313 for receiving and scheduling network communications for traversal across network 340.

In FIG. 9A, a user VM 902a running in the networked virtualization environment issues a data communication in the form of an I/O request 901 to its corresponding controller VM 910a. The corresponding controller VM 910a may then associate a QoS hint with the I/O request 901 in the manner described above in FIG. 6. This may involve identifying the virtual disk corresponding to the I/O request, determining the user VM issuing the I/O request based on the identified virtual disk, identifying a QoS policy associated with the user VM and associating a QoS hint with the I/O request.

Figure 9B:
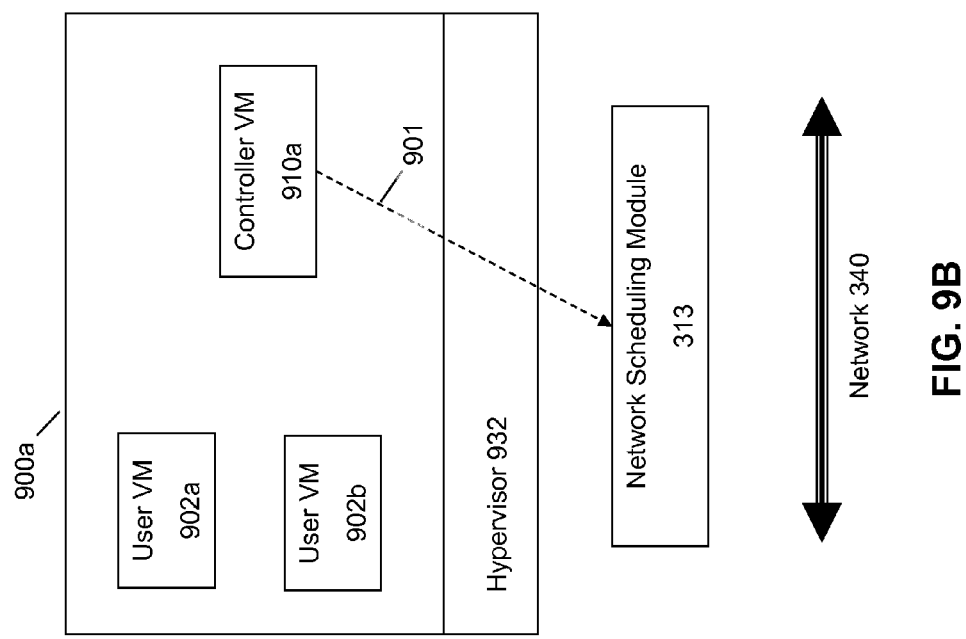
Figure 9C:
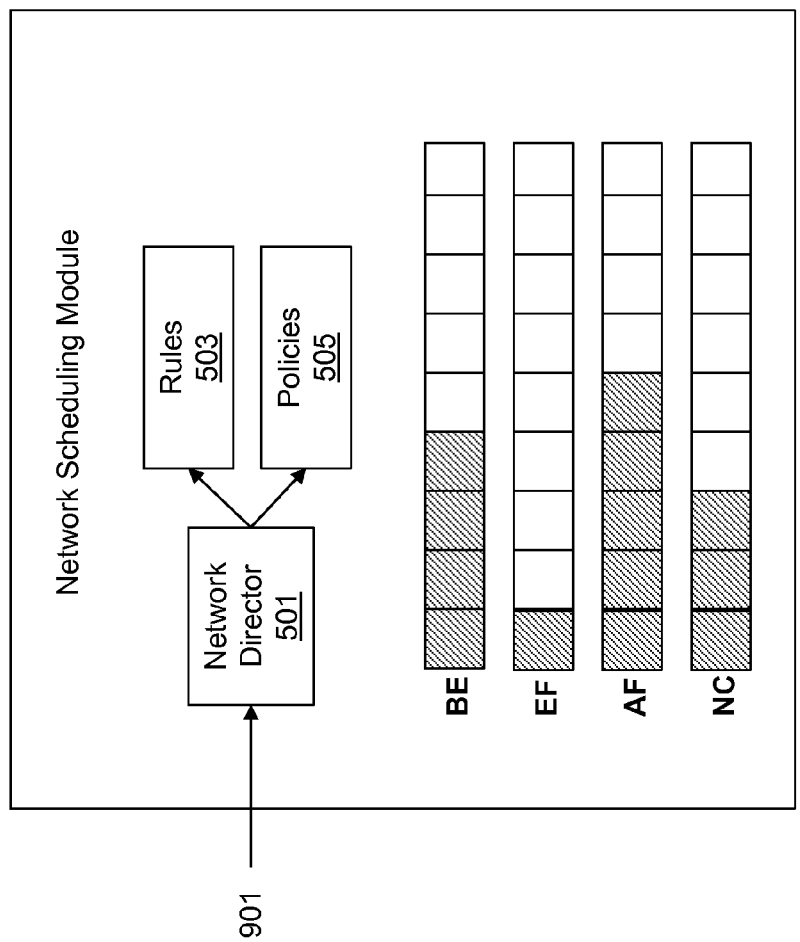
Figure 9D:
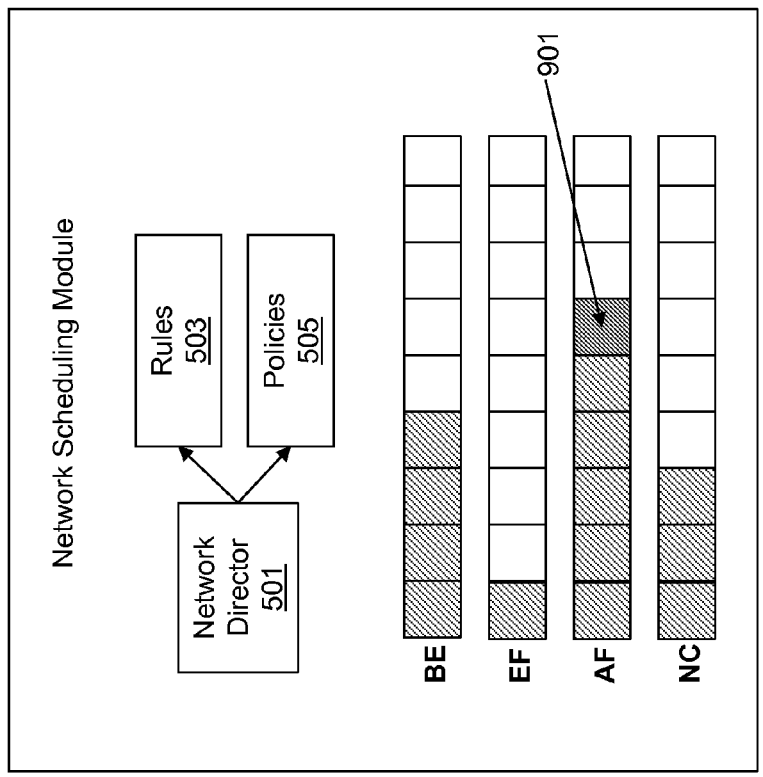

After the QoS hint has been associated with the I/O request 901, the I/O request 901 is forwarded to the network scheduling module 313 as illustrated in FIG. 9B. The network director 501 of the network scheduling module 313 may receive the I/O request 901 as illustrated in FIG. 9C and then place the I/O request 901 in an appropriate position in an appropriate queue as shown in FIG. 9D. The network scheduling module may place the user VM issued I/O request 901 in the appropriate queue using the techniques described above in FIGS. 7 and 8.

Placing the I/O request 901 in the appropriate position in the appropriate queue may involve locating the QoS hint associated with the I/O request 901, identifying the QoS policy associated with the user VM that issued the I/O request 901, and applying a set of rules to the QoS policy to generate a score for the I/O request 901. The score generated for the I/O request 901 may then be used to categorize the I/O request 901 into a corresponding prioritization class queue and also used to place the I/O request 901 in an appropriate position inside the queue associated with the corresponding prioritization class.

In FIG. 9D, it is determined that the score generated for the I/O request 901 corresponds to an assured forwarding (AF) prioritization class queue and so the I/O request is placed in a queue associated with the assured forwarding (AF) prioritization class. For purposes of simplicity, each prioritization class illustrated in FIG. 9D includes a single queue. However, it is important to note that as mentioned above multiple queues may be associated with each prioritization class. Because the score for the I/O request lies closer to the low end of the range of scores making up the assured forwarding (AF) prioritization class, the I/O request 901 is placed at the end of the queue associated with the assured forwarding (AF) prioritization class.

Figure 9E:
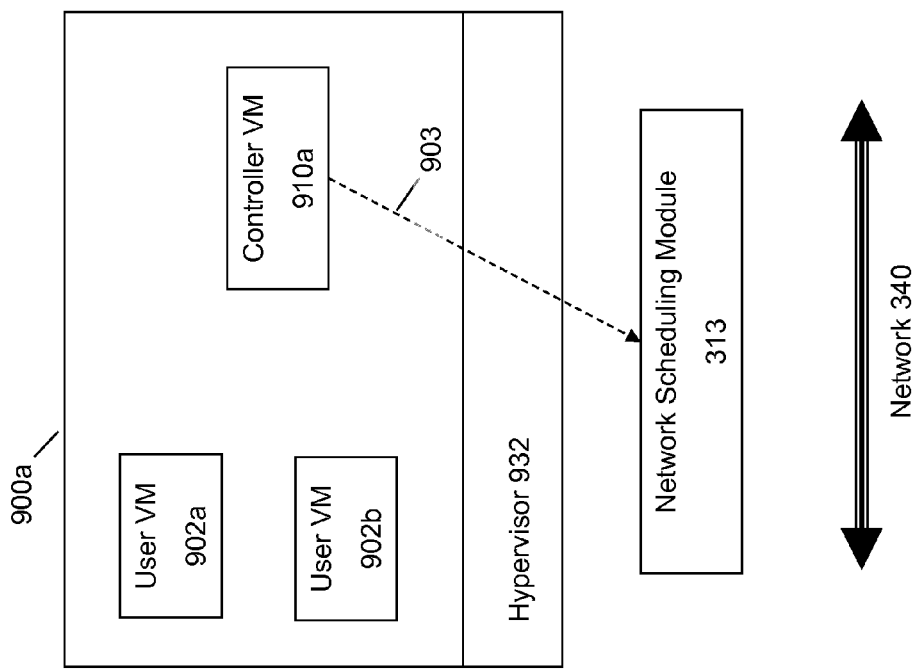

After the user VM issued I/O request 901 has been placed in an appropriate position in an appropriate queue, the controller VM 910a issues a control communication 903 to the network scheduling module 313 as illustrated in FIG. 9E.

Figure 9F:
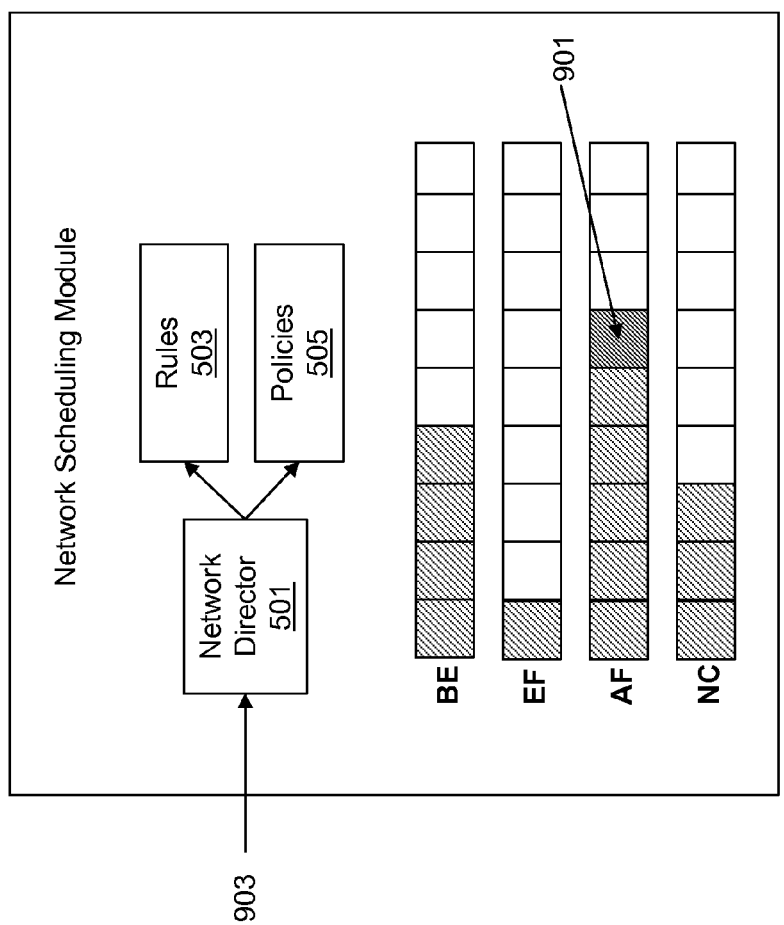
Figure 9G:
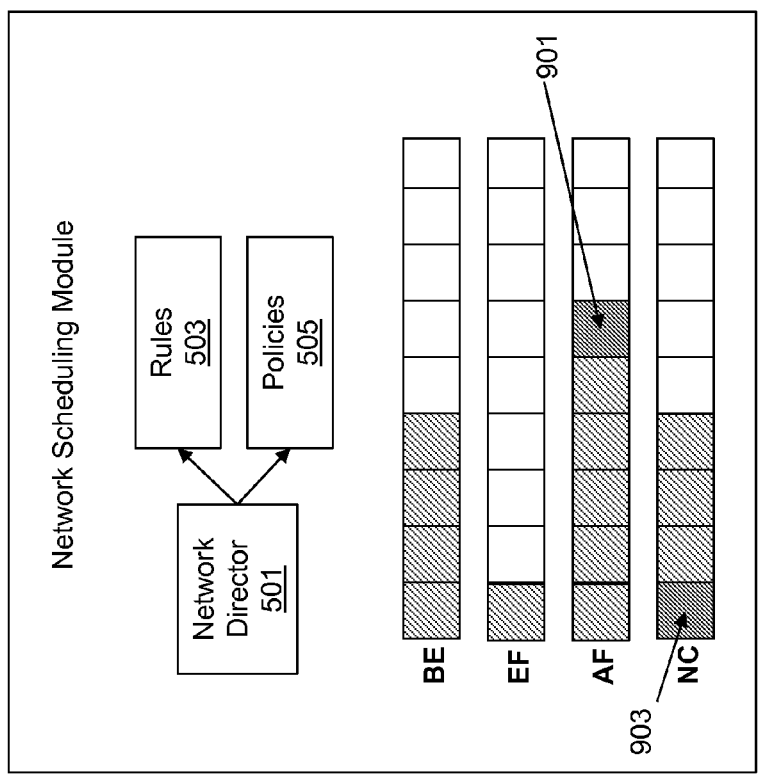

The network director 501 of the network scheduling module may receive the controller VM issued control communication 903 as illustrated in FIG. 9F and then place the controller VM issued control communication 903 in an appropriate position in an appropriate queue as shown in FIG. 9G. The network scheduling module may place the controller VM issued control communication 903 in the appropriate queue using the techniques described above in FIGS. 7 and 8.

Placing the controller VM issued control communication 903 in the appropriate position in the appropriate queue may involve identifying a control communication prioritization type for the controller VM issued control communication using a prioritization scheme associated with controller VM issued control communications and applying a set of rules to the control communication prioritization type associated with controller VM issued control communication to generate a score for the controller VM issued control communication. The score generated for the controller VM issued control communication may then be used to categorize the controller VM issued control communication request into a corresponding prioritization class queue and also used to place the controller VM issued control communication in an appropriate position inside the queue associated with the corresponding prioritization class.

In FIG. 9G, it is determined that the score generated for the controller VM issued control communication corresponds to a network control (NC) prioritization class and so the controller VM issued control communication is placed in a queue associated with the network control (NC) prioritization class. For purposes of simplicity, each prioritization class illustrated in FIG. 9F includes a single queue. However, it is important to note that as mentioned above multiple queues may be associated with each prioritization class. Because the score for the controller VM issued control communication lies closer to the high end of the range of scores making up the network control (NC) prioritization class, the controller VM issued control communication is placed at the front of the queue associated with the network control (NC) prioritization class.

Thus, by providing QoS implementation for the networked virtualization environment having a converged network where both data communications and control communications traverse the same network, user VMs are be provided with storage functionality that aligns with the service level guarantees defined by their QoS policies and controller VM issued control communications may handled in an efficient and optimal manner that aligns with a control communication prioritization scheme.

System Architecture

Figure 10:
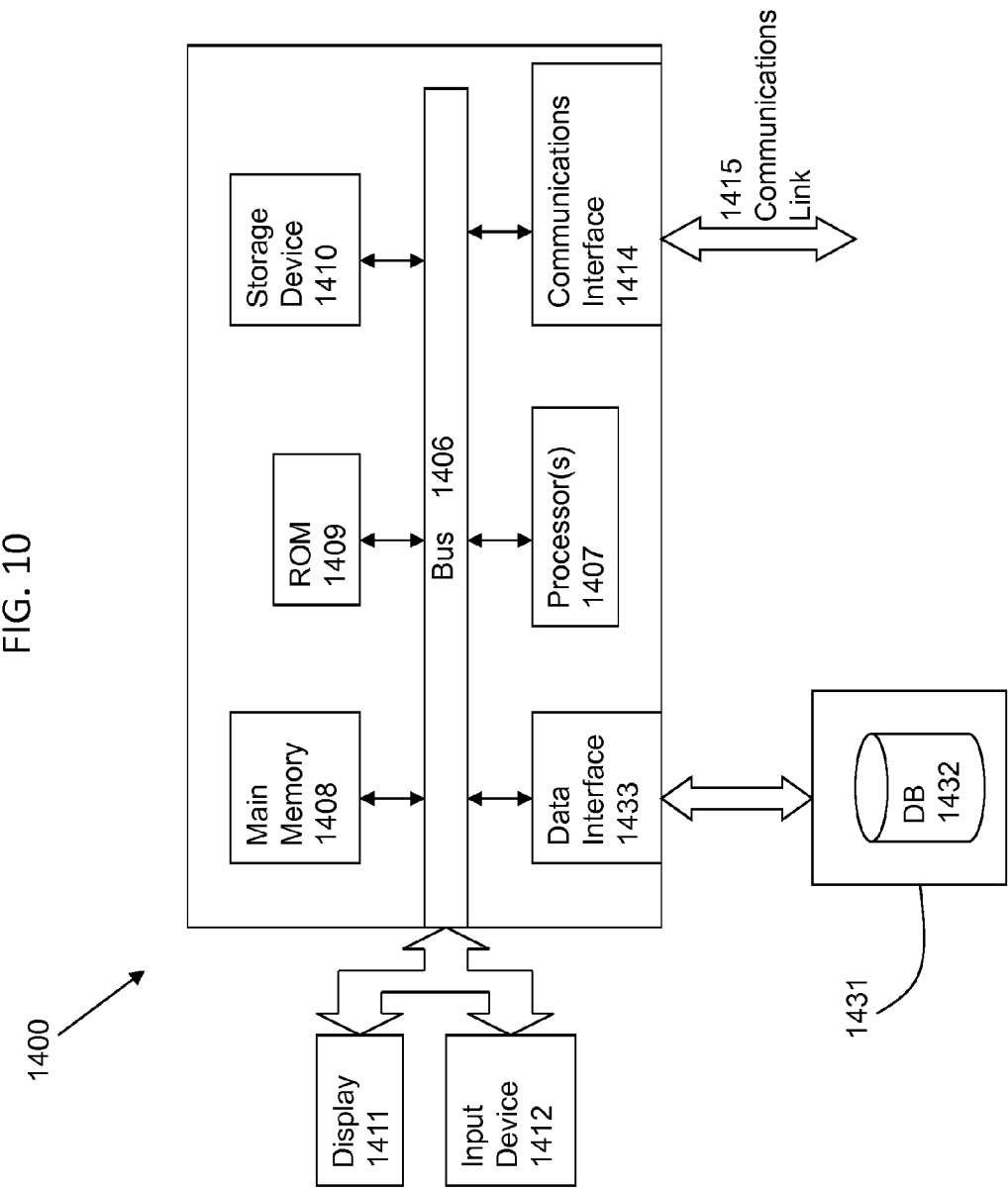
FIG. 10 is a block diagram of a computing system suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing quality of service (QoS) for network communications sharing a network in a networked virtualization environment for storage management, comprising:

receiving, from a first controller virtual machine (VM), a network communication to be sent to a second controller VM;

determining whether the network communication is a data communication type issued by a user virtual machine (VM) or a control communication type issued by the first controller VM and addressed to the second controller VM;

applying a set of rules to the network communication based at least in part on whether the network communication is a data type communication issued by a user VM or a control communication type issued by the first controller VM and addressed to the second controller VM; and placing the network communication in a prioritization class queue based on a result of applying the set of rules to the network communication.

2. The method of claim 1, wherein applying the set of rules to the network communication based on its communication type comprises:
- identifying a QoS policy for the user VM issuing the network communication when the network communication is the data communication type; and
- applying the set of rules against the QoS policy.

3. The method of claim 2, wherein identifying the QoS policy for the user VM issuing the network communication comprises locating a QoS hint associated with the network communication.

4. The method of claim 3, wherein the QoS hint is associated with the network communication by the first controller VM.

5. The method of claim 1, wherein applying the set of rules to the network communication based on its communication type comprises:
- identifying a control communication prioritization type for the network communication when the network communication is the control communication type; and
- applying the set of rules against the network communication using the control communication prioritization type.

6. The method of claim 1, wherein the result of applying the set of rules to the network communication based on its communication is a score.

7. The method of claim 6, wherein placing the network communication in the prioritization class queue based on the score comprises:
- categorizing the network communication into a prioritization class based on the score; and
- placing the network communication into a queue of the prioritization class based on the score.

8. The method of claim 1, wherein the prioritization class queue belongs to one of a plurality of queue prioritization classes.

9. The method of claim 8, wherein the plurality of queue prioritization classes are associated with different network parameters.

10. The method of claim 8, wherein at least one of the plurality of queue prioritization classes comprises two or more queues, the two or more queues having different scheduling policies.

11. The method of claim 1, wherein the network communication is the data communication type and wherein the network communication is directed at virtual storage devices managed by a different controller VM.

12. The method of claim 11, wherein the network communication is the data communication type and wherein the network communication is directed at virtual storage devices managed by the controller VM.

13. A computer program product embodied on a non-transitory computer readable medium, the non-transitory computer readable medium having stored thereon a sequence of instructions which, when executed by a processor causes the processor to execute a method for implementing quality of service (QoS) for network communications in a networked virtualization environment for storage management, comprising:
- receiving, from a first controller virtual machine (VM), a network communication to be sent to a second controller VM;
- determining whether the network communication is a data communication type issued by a user virtual machine (VM) or a control communication type issued by the first controller VM and addressed to the second controller VM;
- applying a set of rules to the network communication based at least in part on whether the network communication is a data type communication issued by a user VM or a control communication type issued by the first controller VM and addressed to the second controller VM; and
- placing the network communication in a prioritization class queue based on a result of applying the set of rules to the network communication.

14. The computer program product of claim 13, wherein applying the set of rules to the network communication based on its communication type comprises:
- identifying a QoS policy for the user VM issuing the network communication when the network communication is the data communication type; and
- applying the set of rules against the QoS policy.

15. The computer program product of claim 14, wherein identifying the QoS policy for the user VM issuing the network communication comprises locating a QoS hint associated with the network communication.

16. The computer program product of claim 15, wherein the QoS hint is associated with the network communication by the first controller VM.

17. The computer program product of claim 13, wherein applying the set of rules to the network communication based on its communication type comprises;
- identifying a control communication prioritization type for the network communication when the network communication is the control communication type; and
- applying the set of rules against the network communication using the control communication prioritization type.

18. The computer program product of claim 13, wherein the result of applying the set of rules to the network communication based on its communication is a score.

19. The computer program product of claim 18, wherein placing the network communication in the prioritization class queue based on the score comprises:
- categorizing the network communication into a prioritization class based on the score; and
- placing the network communication into the prioritization class queue of the prioritization class based on the score.

20. The computer program product of claim 13, wherein the prioritization class queue belongs to one of a plurality of queue prioritization classes.

21. The computer program product of claim 20, wherein the queue prioritization classes are associated with different network parameters.

22. The computer program product of claim 20, wherein at least one of the plurality of queue prioritization classes comprises two or more queues, the two or more queues having different scheduling policies.

23. The computer program product of claim 13, wherein the network communication is the data communication type and wherein the network communication is directed at virtual storage devices managed by a different controller VM.

24. The computer program product of claim 13, wherein the network communication is the data communication type and wherein the network communication is directed at virtual storage devices managed by the controller VM.

* * * * *